UNITED STATES PATENT OFFICE.

JOHN RAMDOHR, OF VIRGINIA CITY, NEVADA.

IMPROVED PROCESS FOR REFINING METALS.

Specification forming part of Letters Patent No. 48,438, dated June 27, 1865.

*To all whom it may concern:*

Be it known that I, JOHN RAMDOHR, of Virginia City, in the county of Storey and State of Nevada, have invented a new and Improved Process for Refining Gold and Silver Amalgam; and I do hereby declare that the following is a full, clear, and exact description of the same, which will enable those skilled in the art to make and use it.

Gold and silver amalgam, such as commonly called "crude bullion," contains principally gold, silver, copper, zinc, and iron, and the object of this invention is to separate the base metals from the gold and silver.

The invention relates to a process composed of the successive applications to the crude bullion above named of diluted sulphuric and muriatic acid, whereby soluble sulphates and muriates are formed, and of a high heat under free access of atmospheric air, whereby the base metals are transformed into oxides and predisposed to combine with the oxides subsequently brought in contact with the same, in such a manner that after separating the soluble and insoluble components of the mass by solution in pure water the gold and silver amalgam is obtained in a highly refined or pure state.

In order to carry out my process the crude bullion is broken up in small pieces and put in a vessel containing diluted sulphuric or muriatic acid. The acid, acting on the zinc, iron, and copper contained in the crude bullion, forms soluble sulphates or muriates of these metals. After all chemical action ceases the pieces are taken out of the dissolving-vessels and washed out with water on a suitable filter. After being washed or sweetened the pieces of crude bullion are taken out of the filter and put on a dry kiln or in a reverberating-furnace, where they are heated to a red heat under free access of atmospheric air. The base metals—copper, zinc, and iron—still remaining in the crude bullion after the first treatment with acid in a metallic state are, by heating to a red heat under free access of air, transformed into oxides. While yet hot the pieces of crude bullion are thrown again in a vessel containing diluted sulphuric or muriatic acid. The oxides of copper, iron, and zinc are thereby almost instantly transformed into soluble sulphates or muriates, which are separated by a second washing or sweetening with water. If, after having passed through these three manipulations, the bullion has not yet obtained the requisite degree of fineness, repeated heating, dissolving, and sweetening have to be resorted to in order to produce the desired result.

What I claim as new, and desire to secure by Letters Patent, is—

The within-described process of refining the amalgam of gold and silver, commonly known as "crude bullion," said process consisting of three subsequent manipulations, substantially such as set forth.

JOHN RAMDOHR.

Witnesses:
O. THOMPSON,
W. HAUFF.